UNITED STATES PATENT OFFICE.

WILLARD F. CRONKHITE, OF SYRACUSE, NEW YORK, ASSIGNOR TO HENRY NOXON AND ORVILLE M. CRONKHITE, OF SAME PLACE.

IMPROVED COMPOSITION FOR PAINT.

Specification forming part of Letters Patent No. 43,944, dated August 23, 1864.

*To all whom it may concern:*

Be it known that I, WILLARD F. CRONKHITE, of the city of Syracuse, in the county of Onondaga and State of New York, have invented or produced a new and original Combination of Ingredients for Paint; and I do hereby declare that the following is a full and exact description of the several ingredients used and the combination of the same.

The component parts of this invention and their proportions are as follows: white lead, or yellow ocher, or white zinc, or brown zinc, or drab zinc, or Venetian red, or lamp-black, one hundred pounds; one quart of lard-oil, two pounds of gum-shellac, two pounds of beeswax, one pound of litharge, or any other substance that will act as a drier, and six gallons of raw or boiled linseed-oil.

The compound is made in the following manner: Put one hundred pounds of white lead, or yellow ocher, or white zinc, or brown zinc, or drab zinc, or Venetian red, or lamp-black in a mixing-tub, and put in six gallons of oil, and stir it thoroughly in the paint. Then melt two pounds of gum-shellac in oil, using oil only sufficient to melt, and put that, when melted, in the mixing-tub with the paint, and thoroughly stir it in. Then melt two pounds of beeswax in raw or boiled linseed-oil, as before, and stir that in. Then stir in one quart of lard-oil. Then let the mixture stand twelve hours, when it will become thick. Then dissolve in oil one pound of litharge, or any other substance that will act as a drier, and stir that in the mixture. Then stir in sufficient oil to make the mixture thin enough for use.

What I claim as my invention, and desire to secure by Letters Patent, is—

The combination of the several ingredients, as described, in the manner substantially as and in about the proportions set forth.

WILLARD F. CRONKHITE.

Witnesses:
 LOUIS F. SMITH,
 Z. CHAS. FOOT.